March 13, 1951     J. C. RICHARDSON     2,545,167
THREADED COUPLING
Filed March 5, 1947
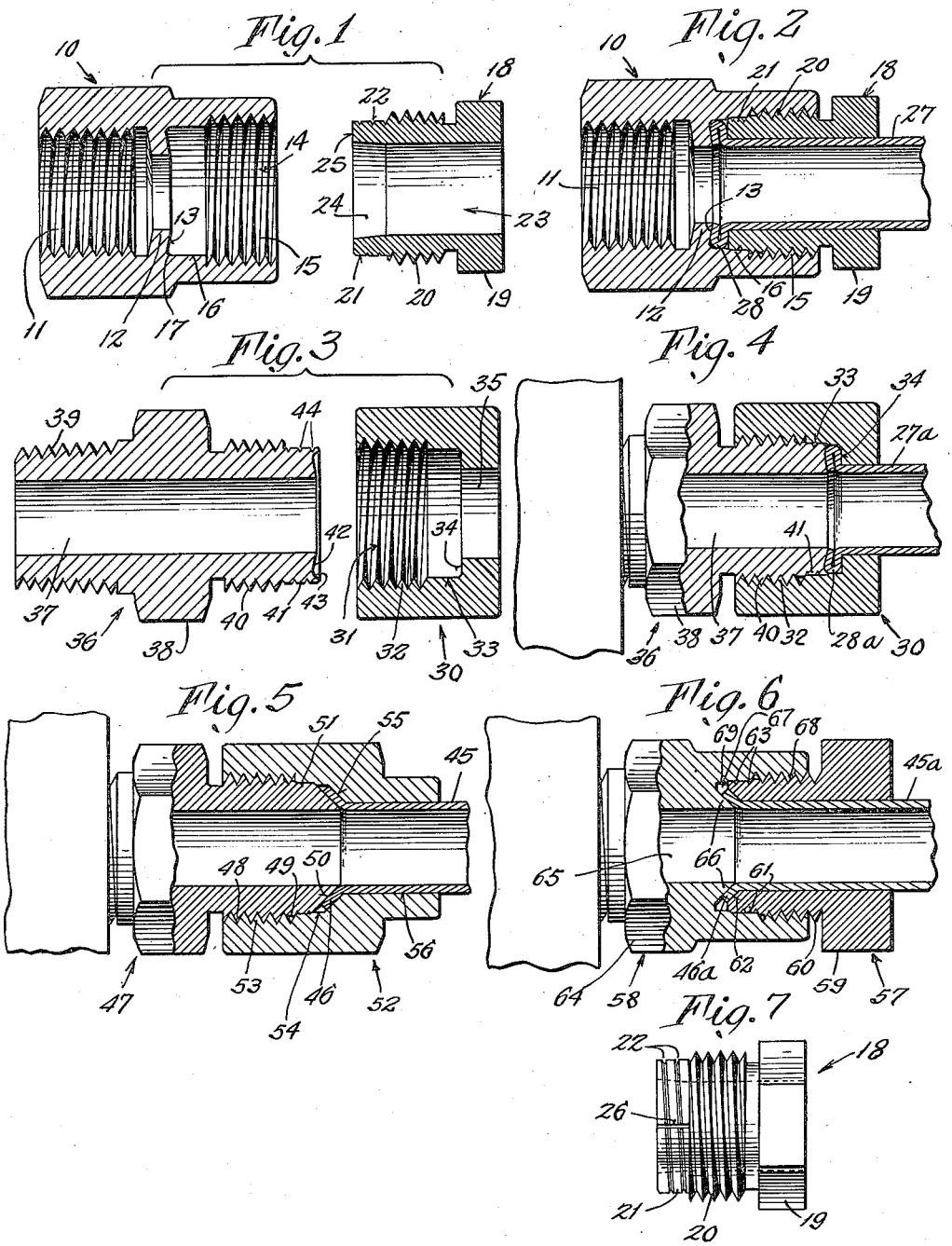
INVENTOR.
James C. Richardson
BY
Johnson, Kline and Hensel
ATTORNEYS Patented Mar. 13, 1951

2,545,167

UNITED STATES PATENT OFFICE 2,545,167

THREADED COUPLING

James C. Richardson, Waterbury, Conn., assignor to The Brockway Company, Naugatuck, Conn., a corporation of Connecticut Application March 5, 1947, Serial No. 732,486

1 Claim. (Cl. 285—86)

This application relates to an improvement in couplings for threadless ductile pipes, tubes, conduits and other hollow elongate tubular bodies (hereinafter called "pipe") wherein a portion of the pipe, usually at the end thereof, is clamped between parts of the coupling to form a leaktight connection therewith.

Couplings for threadless ductile pipe of the aforesaid type generally comprise a pair of coupling members having threaded engagement for bringing clamping surfaces on the same members, or on other coupling parts associated therewith, into clamping relation with a portion of the pipe so as to form a leaktight connection. The portion of the pipe which is brought into such clamping relation is usually deformed as by provision of a flare, flange, ridge or groove, affording a bearing surface on the pipe which is engaged by one of the threaded coupling members or a part of the coupling associated therewith.

In general, the clamping effect of the threaded members is produced by thrust applied against a transverse bearing surface, or a wedge surface on other parts of the coupling or on the pipe itself, such thrust being virtually instantaneously released upon initial retrograde threading operation of the coupling members. When such retrograde movement occurs, the coupling is no longer positively held in leaktight condition by the threaded members, and the connection is subject to failure causing leakage, particularly when subjected to relatively high internal fluid pressure. When subjected to vibration during use, initial retrograde threading of the coupling members is extremely likely to occur and when this occurs, resistance to further loosening of the coupling is lost and the coupling fails.

To overcome this difficulty, various means have been proposed, such as packing rings, lock nuts and the like usually adapted to apply resilient frictional force resisting relative rotation of the threaded members. However, such means requires the provision of additional parts in the coupling increasing the cost or effort required for manufacture and assembly thereof. Resilient packing materials are subject to deterioration in use, and are generally limited in their application by reason of the conditions of temperature and pressure, and/or by reason of the nature of the fluids to which the coupling is exposed.

It is an object of this invention to provide means for frictionally restraining a pair of threaded coupling members from relative rotation when they are threaded into pipe-clamping relation, said means being substantially uniformly operative over a substantial range of threaded movement of the members, so as to render the coupling highly resistant to loosening by vibration, and requiring no additional coupling parts but being incorporated in the construction of the threaded members themselves. In particular, it is an object of my invention to provide a simple coupling for flanged or flared threadless ductile pipe having only two coupling members which, when threaded together into pipe-clamping engagement, effectively resist loosening by vibration.

Thus, in accordance with my invention, the threaded members of a coupling of the aforesaid type respectively include a pair of cylindrical surfaces, one surface being internal and the other external, adapted to engage each other telescopically when the two members are threaded into pipe-clamping relation. The external cylindrical surface on one of the threaded members is slightly oversized with respect to the corresponding internal cylindrical surface on the other member, so that telescopic engagement thereof results in a force-fit. The material of the two members yields slightly to permit said surfaces to engage each other and thereafter hold the members frictionally against relative rotation. Unlike wedge surfaces or tranverse clamping surfaces, the interengaging cylindrical surfaces resist unthreading operation of the two members substantially uniformly throughout a substantial range of threading operation, so that vibration is ineffective to initiate or continue loosening of the coupling.

In the preferred embodiment of the invention, the coupling comprises only two members, one male and one female, having threaded engagement and adapted to clamp a flange or flare (hereinafter called a "flange") on the pipe between them. The male member has a cylindrical external surface, preferably at its forward end or nose, extending outward from the external threads thereon, while the female member has a cylindrical cavity or socket disposed inwardly of its internal threads, the cavity being slightly undersized with respect to the cylindrical nose on the male member. When the two members are threaded together into clamping relation with the flange on the pipe, the cylindrical nose enters the cylindrical cavity in force-fit relation and thereafter the two members are frictionally held in flange-clamping relation.

In forming the force-fit between the cylindrical portions of the two members, the nose of the male member may be slightly constricted.

Thus, when the pipe to be clamped passes through the male member, it is often desirable to construct the bore thereof within the nose of slightly larger diameter than the pipe, for example, by providing a gradual flare at the leading end thereof, so that constriction of the nose will not cause corresponding construction of the pipe.

To facilitate manufacture of such coupling members, it is preferable to make the cylindrical walled cavity at the inner end of the female member of the same diameter as the apices of the threads therein, so that the cavity of this member can be made by a single boring and threading operation. The nose of the male member, which is slightly oversized with respect to the inner end of said cavity, has a diameter slightly exceeding the root diameter of the external threads on the male member. Thus, in cutting the threads on the male member, the chasing tool or other instrument employed is advantageously allowed to run out over the cylindrical nose, cutting a shallow thread therein so that the nose can be readily threaded into the female member. The shallow thread on the nose does not interfere with formation of a force-fit when the coupling is made up, but tends to form a tighter fit.

My invention will be more fully understood from the following description, taken in conjunction with the accompanying drawings wherein:

Figure 1 is an exploded view in axial cross-section of a coupling embodying my invention;

Fig. 2 is an axial cross-section of a connection made up with the coupling of Fig. 1;

Fig. 3 is an exploded view in axial cross-section of a modified form of coupling;

Fig. 4 is a view partially in axial cross-section of the coupling of Fig. 3 assembled with a ductile threadless pipe;

Figs. 5 and 6 are views partially in axial cross-section of additional forms of couplings embodying my invention and assembled with ductile threadless pipe;

Fig. 7 is a side elevation of a nut employed in the coupling of Fig. 1.

Referring to the drawings, the coupling illustrated in Figs. 1 and 2 is adapted for use with ductile pipe having an upset double-walled radial flange on the end thereof. The coupling comprises a female member 10, having means such as an internally threaded cavity 11 at its rear end for attachment to threaded pipes, fittings or other structures. Intermediate the ends of the member 10 an annular abutment 12 is provided forming a seat 13 at the base of a cavity 14 opening at the opposite or front end of the coupling member. The cavity 14 has internal threads 15 extending inward part way to the seat 13 at its base, and a cylindrical wall 16 extending inward from the threads to the seat 13, and advantageously of the same diameter as the apices of threads 15. The seat 13 advantageously slopes forwardly towards its inner periphery, forming a narrow angle with a transverse plane of the coupling member, and joining the cylindrical wall 16 at a rounded corner 17.

The other coupling member 18 is a male member having a wrench-engaging portion 19 of hexagonal or other conventional shape at its rear end; external threads 20 extending forwardly thereon part way to the leading end, and adapted to engage the internal threads 15 in member 10; and a nose 21 having a cylindrical exterior surface of slightly oversized diameter as compared with the cylindrical wall 16 at the inner end of cavity 14 on the member 10. The diameter of the nose 21 thus slightly exceeds the root diameter of the threads 20 on member 18, and to permit the nose 21 to enter the threaded portion of the female coupling member, the root portion of threads 20 are continued over the nose 21, forming a shallow thread 22 in its cylindrical surface.

A bore 23 extends through the member 18 for slidably receiving the pipe to be clamped in the coupling; and advantageously, a gradually flared portion 24 is formed at the leading end of the bore 23 within the nose portion 21, to compensate for constriction of the nose 21 when the latter enters the cylindrical portion 16 of the cavity 14.

The front end surface 25 of the male member 18 is preferably flat, thus diverging slightly in radial direction from the seat 13 at the base of cavity 14 when the members are assembled.

If the coupling member 18 is of relatively rigid material, such as bronze or steel, constriction of nose 21 on entering cylindrical cavity 16 on the female member 10 can be facilitated by providing one or more longitudinal slots 26 in the nose 21 as shown in Fig. 7. However, when member 18 is of relatively soft metal, such as brass or copper, slots 26 are not required.

In order to make up a connection with the coupling shown in Fig. 1, the male member 18 is placed on a ductile pipe 27 having a radially extending double-walled upset flange 28 at the end thereof, the flat end surface 25 of the member 18 facing the rear side of the flange 28. The flange 28 is of suitable diameter for entering the cylindrical portion 16 of the cavity 14 on member 10. The male member 18 is then threaded into cavity 14 of member 10, flange 28 entering the cylindrical portion 16 thereof. Further threading operation of member 18 on member 10 forces the slightly oversized cylindrical nose 21 to enter the cylindrical walled portion 16 of the cavity 14 in force-fit relation. When the nose 21 is constricted by entering the undersized cylindrical portion 16 of cavity 14, the walls of the flared portion 24 of bore 23 are brought substantially into alignment with the rest of the bore, so that no substantial constriction of the pipe 27 occurs at the base of flange 28.

Finally, the leading end surface 25 clamps the flange 28 tightly against seat 13 in leaktight relation, the metal of the flange being entrapped by the divergence in radial direction of surface 25 and seat 13. A leaktight joint is thus formed between the pipe and the seat.

Preferably, a number of turns of member 18 on member 10 are required to complete the clamping operation after the nose 21 enters the cylindrical portion 16 of the cavity 14. The cylindrical wall 16 thus engages nose 21 frictionally through a substantial range of the final threading operation of the two coupling members, so that they are forcibly restrained against retrograde threading through a corresponding distance, effectively preventing the loosening of the connection by vibration, and reliably maintaining the leaktight connection between the pipe and the member 10.

In the coupling shown in Figs. 3 and 4, the two coupling members are inverted as compared with the coupling shown in Figs. 1, 2 and 7. The female coupling member encircles the pipe behind the flange thereon and the male member engages the front surface of the flange.

Thus, female member 30 is a hollow nut having a cavity 31 of a diameter adapted to receive the flange on the end of the pipe to be connected thereby, said cavity having internal threads 32 extending part way inward from its outer end, and an inner cylindrical portion 33 extending from the threads to a transverse substantially flat annular shoulder 34 which is adapted to engage the rear surface of the flange on the pipe. A central aperture 35 at the rear of the nut conforms substantially to the outside diameter of the pipe and encircles the same at the base of the flange.

The male coupling member 36, as illustrated, is in the form of a standard S. A. E. fitting, having a passage 37 extending therethrough to communicate with the pipe; a central nut portion 38 for engaging a wrench, and a threaded rear portion 39 for securing the fitting in a correspondingly threaded orifice of another structure.

External threads 40 are provided on the opposite or front end portion, extending part way to the leading end thereof, and a nose portion 41 is provided having a cylindrical external surface.

The leading end surface 42 of coupling member 36 is advantageously formed by a shallow annular cavity, as shown, diverging rearwardly adjacent the passage 37 and having a re-emergent peripheral rim 43. The end surface 42 is adapted to engage the front side of a flange on the end of a pipe, and by reason of the divergence of the end surface from shoulder 34 in the nut 30, entraps the material of the flange and forces it radially outward between the two surfaces.

The cylindrical wall 33 of the cavity 31 in the nut is preferably of the same diameter as the apices of threads 32 therein, so that the cavity 31 can be formed by a single boring operation, and the threads 32 then cut in the bore. The cylindrical nose 41 on the member 38 is slightly oversized in diameter as compared with the cylindrical cavity 33, and is accordingly of slightly greater diameter than the root diameter of the threads 40. In order to permit the nose 41 to be threaded into cavity 31, the root portion of threads 40 is continued outward to the end of the nose 41, forming shallow threads 44 thereon.

To make up a connection with the coupling of Figs. 3 and 4, the nut 30 is placed on pipe 27a behind an upset double-walled flange 28a on the end of the pipe and threaded on to the end of fitting 36. As the cylindrical nose 41 enters the cylindrical walled portion 33 of the cavity 31, a force-fit is formed offering frictional resistance to relative rotation of the coupling members. Finally, flange 28a is clamped between the end surface 42 on the member 36 and the shoulder 34 at the base of the cavity in nut 30. The force-fit of cylindrical nose 41 in the cylindrical portion 33 of cavity 31 effectively resists unthreading of the coupling when subjected to vibration.

In the modified form of coupling shown in Fig. 5, the coupling members are adapted to receive and clamp a ductile pipe 45, having a conical flare 46 on the end thereof, in leaktight relation with a fitting 47. The latter has external threads 48, a cylindrical nose 49 and a conical flare-engaging surface 50 at the leading end thereof. The nose 49 is of slightly greater diameter than the root diameter of threads 48, and the latter extend to the end of the nose 49, forming a shallow thread 51 upon the surface thereof. Otherwise, the fitting is similar in construction to the member 36 shown in Fig. 3.

The female coupling member or nut 52 has a cavity therein with threads 53 extending part way inward to engage the external threads 48 on the body 47; a cylindrical inner portion 54, slightly undersized in diameter with respect to the nose 49, and having, for example, a diameter equal to that of apices of the threads 53, said cavity terminating at a conical flare-engaging surface 55; and an aperture 56 for slidably receiving the pipe 45.

When the coupling members are threaded together so as to clamp flange 46 between surfaces 50 and 55, the oversized nose 49 enters cylindrical portion 54 of the cavity in the nut in force-fit relation for a substantial part of the threading operation required to clamp the flange. Accordingly, the resulting frictional resistance to relative rotation of the coupling members prevents retrograde threading thereof to loosen the connection, particularly when subjected to vibration.

The modification shown in Fig. 6 is likewise constructed for use with a pipe 45a having a conical flange 46a on the end thereof. In this form of coupling, the male member 57 encircles the pipe behind the flange while the female member 58 engages the front of the flange. Thus, the member 57 has a nut portion 59 at its rear end, external threads 60 extending part way to the leading end thereof, and a cylindrical nose portion 61 of slightly greater diameter than the root diameter of the threads 60. At its leading end, it comprises a reentrant conical clamping surface 62 for engaging the rear of the flange 46a. The root portion of threads 60 extends to the end of the nose 61 forming shallow threads 63 therein as shown.

The female member 58 comprises, for example, a nut portion 64, a passage 65 terminating at a flare-engaging conical projection 66 at the base of the cavity 67, the latter having an outer threaded portion 68, and an inner cylindrical portion 69 extending to the base of the flare-engaging projection 66. The cylindrical portion 69 of the cavity is slightly undersized in diameter with respect to the nose 61 on the member 57, having for example, a diameter equal to that of the apices of the threads 68.

Operation of the coupling is similar to that shown in Figs. 1 and 2. The member 57 is placed on pipe 45a behind flange 46a and is threaded into the cavity of female member 58. When the flange 46a is clamped between surfaces 62 and 66 on the two members respectively, cylindrical nose 61 has entered the cylindrical portion 69 of the cavity of member 58 in force-fit relation and is retrained therein frictionally against retrograde threading. The resulting connection is therefore reliably held against loosening by vibration.

Variations can be made in the embodiments hereinbefore described without departing from the scope of my invention. Thus, additional coupling parts for clamping or gripping the pipe or the flange, can be interposed between one or both of the coupling members and the pipe or flange. However, in each case, the threaded coupling members include a pair of cylindrical surfaces which engage each other in force-fit relation to resist loosening of the connection when they are brought into pipe-clamping relation.

Variations and modifications may be made within the scope of this invention and portions of the improvements may be used without others.

I claim:

In a coupling for threadless ductile pipe, a pair of coupling members comprising a male member having an externally threaded portion and a female member having an internally threaded portion, said members having threaded engagement and being operative upon relative rotation in one direction to clamp a portion of a threadless pipe in leak-tight engagement between them, an internal cylindrical surface on said female coupling member, and an external cylindrical surface on said male coupling member, said external surface extending from the threaded portion to the nose of said male member and being slightly oversized in diameter with respect to the root diameter of said threads, and the root portion of said threads extending outward to the end of said nose and being adapted to be forced telescopically into said internal surface in force-fit relation therewith through a substantial range of threading movement when said coupling members are threaded into clamping relation with the pipe, whereby said members are held in clamping relation and frictionally resist unthreading through a substantial range of unthreading movement.

JAMES C. RICHARDSON.

REFERENCES CITED

The following references are of record in the file of this patent:

UNITED STATES PATENTS

| Number | Name | Date |
| --- | --- | --- |
| 1,619,755 | Parker | Mar. 1, 1927 |
| 1,888,338 | Weatherhead | Nov. 22, 1932 |